United States Patent
McCorkendale et al.

(10) Patent No.: US 7,996,836 B1
(45) Date of Patent: Aug. 9, 2011

(54) USING A HYPERVISOR TO PROVIDE COMPUTER SECURITY

(75) Inventors: Bruce McCorkendale, Manhattan Beach, CA (US); Peter Ferrie, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 1226 days.

(21) Appl. No.: 11/618,224

(22) Filed: Dec. 29, 2006

(51) Int. Cl.
G06F 9/455 (2006.01)
G06F 11/00 (2006.01)
H04L 29/06 (2006.01)

(52) U.S. Cl. ............ 718/1; 713/164; 713/165; 713/166; 726/22; 726/23; 726/24

(58) Field of Classification Search ............ 718/1
See application file for complete search history.

(56) References Cited

U.S. PATENT DOCUMENTS

| | | | |
|---|---|---|---|
| 6,658,571 B1* | 12/2003 | O'Brien et al. | 726/26 |
| 7,571,482 B2* | 8/2009 | Polyakov et al. | 726/24 |
| 7,779,478 B2* | 8/2010 | Ivanov et al. | 726/26 |
| 7,845,009 B2* | 11/2010 | Grobman | 726/24 |
| 2005/0289542 A1* | 12/2005 | Uhlig et al. | 718/1 |
| 2007/0271610 A1* | 11/2007 | Grobman | 726/22 |

OTHER PUBLICATIONS

Litty, "Hypervisor-Based Intrusion Detection", Thesis Submitted, University of Toronto, 2005, pp. 1-73.*
Garfinkel et al, "A Virtual Machine Introspection Based Architecture for Instrusion Detection", Citeseer, 2003, pp. 1-16.*
Joshi et al, "Detecting Past and Present Instrusions Through Vulnerability-Specific Predicates", ACM, Oct. 2005, pp. 91-104.*
Ferrie, P., "Attacks on Virtual Machine Emulators," Association of anti-Virus Asia Researchers Conference, Auckland, Dec. 3, 2006, pp. 128-143.

* cited by examiner

*Primary Examiner* — Jennifer N To
(74) *Attorney, Agent, or Firm* — Fenwick & West LLP

(57) ABSTRACT

A computer includes a virtual machine controlled by a hypervisor. The virtual machine runs a virtualized operating system with running processes. A security initialization module sets the state in the virtual machine to pass execution from the virtual machine to the hypervisor responsive to a process making a system call in the virtualized operating system. Responsive to execution being passed from the virtual machine to the hypervisor, a security module analyzes the process making the system call to determine whether it poses a security threat. If a security threat is found, the security module takes remedial action to address the threat.

12 Claims, 4 Drawing Sheets

USING A HYPERVISOR TO PROVIDE COMPUTER SECURITY

BACKGROUND

1. Field of the Invention

This invention pertains in general to protecting a computer from malicious software and in particular to techniques for intercepting system calls.

2. Description of the Related Art

Typically, a process running in an operating system has limited access to system resources to prevent the process from maliciously or accidentally interfering with the functioning of the operating system and other processes. System calls are provided to processes by the operating system as a way for the process to access system resources when necessary. For example, a process may not be allowed direct access to a hard disk, but read( ) and write( ) system calls may be provided to give the process controlled access to the disk. Typically, when a process makes a system call, control is transferred to the operating system kernel which carries out the system call and then returns control to the process.

Malicious software can use system calls to cause undesirable effects on the system. Malicious software running in a process at a user privilege level may make improper system calls in an attempt to switch to the supervisor privilege level and have unrestricted access to the system. Also, malicious software running at any privilege level may make system calls to perform unwanted functions, such as erasing important files on a disk or propagating a virus over the Internet. The malicious software may take advantage of security flaws present in the system calls such as the inability of the system call to properly handle unexpected parameters. Alternatively, the malicious software may use the calls as intended by the operating system but for malicious purposes.

Security software can monitor system calls for evidence of malicious activity and take remedial action if necessary. Kernel patching is a technique for allowing security software to monitor system calls. Kernel patching modifies code and data structures in the operating system kernel to call security software before performing the requested operating system function. For example, the write( ) system call, which is implemented in the kernel, may be patched so that it initially performs various security checks to ensure that it is not being called maliciously. The patching may insert new code at the start of the system call to examine the calling process and the parameters passed to the system call. If there is no security risk, the system call is allowed to continue execution normally, but if a security risk is detected, some action is taken, such as stopping the process and notifying the user.

Kernel patching is performed by legitimate security software, but it is also a technique employed by malicious software such as rootkits and Trojan horses in order to prevent detection and ensure survival. Though there are different ways of dealing with this security threat, some operating systems attempt to prohibit all kernel patching. Though this technique may prevent malicious software from patching the kernel, it also unfortunately prevents legitimate security software from doing so. Often, kernel patching is the best way to effectively and efficiently guard against certain types of attacks on the system.

One way that operating systems may prevent kernel patching is by having an operating system protection module that periodically scans the kernel code and data structures to make sure they have not been modified. If the operating system detects that the kernel has been modified, it may take some action such has halting the system and displaying an error message. An example of such an operating system protection module is PATCHGUARD on 64-bit versions of MICROSOFT WINDOWS operating systems. Although the operating system may provide application programming interface (API) functions as hooks for executing security code as an alternative to kernel patching, the API may not provide all necessary functionality and it may be used by malicious code, even if undocumented. Therefore, there is a need in the art for a way to provide enhanced security in a computer having an operating system that ostensibly prevents kernel patching.

BRIEF SUMMARY OF THE INVENTION

The above need is met by a system, method, and computer program product for providing security in a computer having a virtual machine controlled by a hypervisor. In an embodiment of the system and computer program product, a security initialization module sets a state in the virtual machine to pass execution from the virtual machine to the hypervisor responsive to a system call issued by a process executing within the virtual machine. A security module is activated responsive to execution being passed to the hypervisor due to the state set by the security initialization module. The security module analyzes the process to determine whether it is malicious.

In an embodiment of the method, a computer-implemented method of providing security in a computer having a virtual machine controlled by a hypervisor, comprises setting a state in the virtual machine to pass execution from the virtual machine to the hypervisor responsive to a system call issued by a process executing within the virtual machine. Responsive to execution being passed to the hypervisor, the method analyzes the process to determine whether it is a security threat.

The figures depict an embodiment for purposes of illustration only. One skilled in the art will readily recognize from the following description that alternative embodiments of the structures and methods illustrated herein may be employed without departing from the principles described herein.

DETAILED DESCRIPTION OF THE PREFERRED EMBODIMENTS

Figure 1:
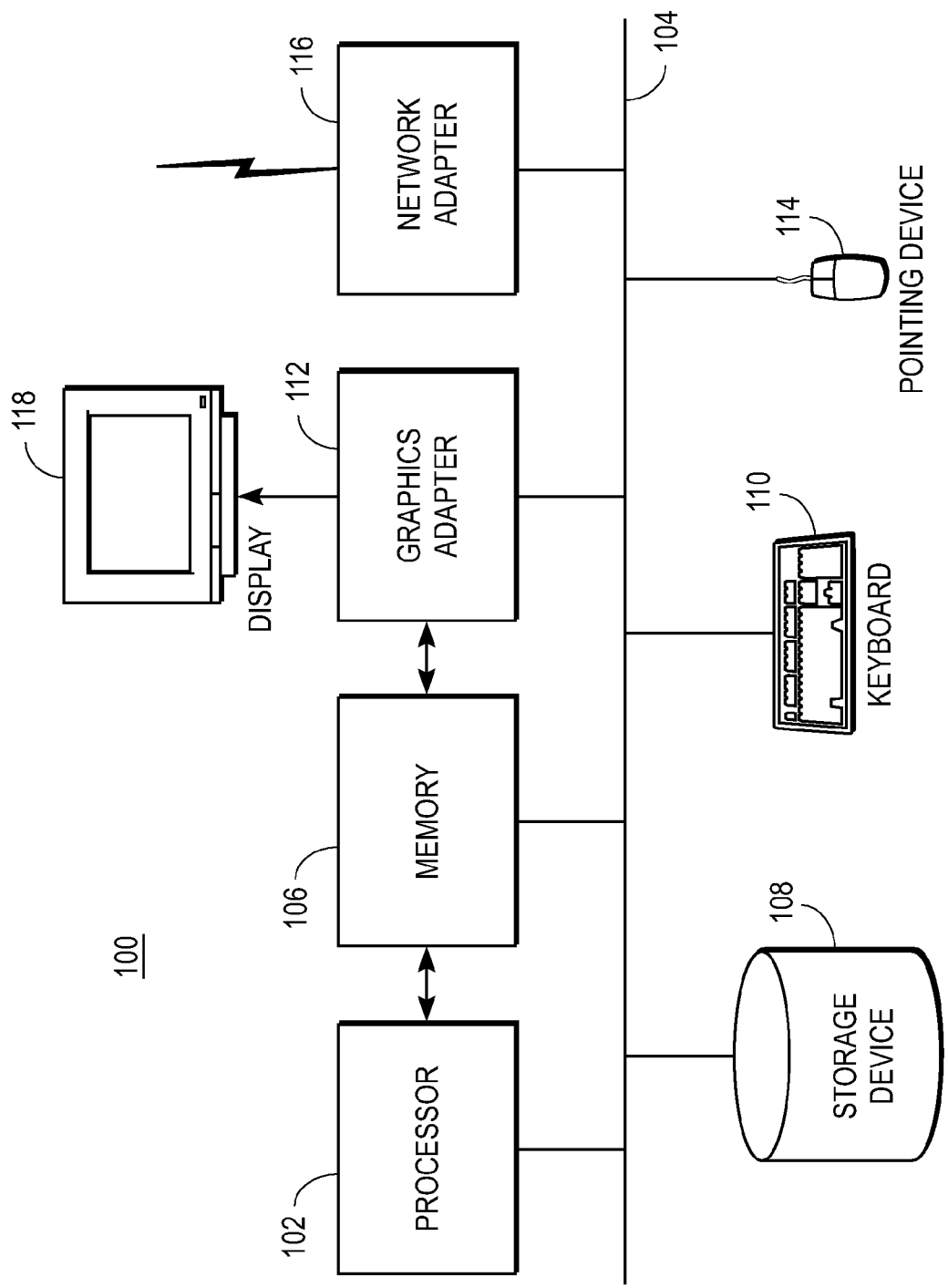
FIG. 1 is a high-level block diagram illustrating a computer using a hypervisor to provide security according to one embodiment.

FIG. 1 is a high-level block diagram illustrating a computer 100 using a hypervisor to provide security according to one embodiment. Illustrated are at least one processor 102 coupled to a bus 104. The processor 102 includes virtualization technology allowing it to support one or more virtual machines. Examples of processor virtualization technologies are Intel Virtualization Technology (IVT) and AMD Virtualization (AMD-V) for x86 processor architectures. Also coupled to the bus 104 are a memory 106, a storage device 108, a keyboard 110, a graphics adapter 112, a pointing device 114, and a network adapter 116. A display 118 is coupled to the graphics adapter 112. The storage device 108 is a device such as a hard drive, CD or DVD drive, or flash memory device, and holds files containing executable code and/or data utilized during the operation of the computer 100. The memory 106, in one embodiment, is a random access memory (RAM) and holds instructions and data loaded from the storage device 108, generated during processing, and/or from other sources.

Computers acting in different roles may have different and/or additional elements than the ones shown in FIG. 1. For example, a computer 100 acting as a server may have greater processing power and a larger storage device than a computer acting as a client. Likewise, a computer 100 acting as a server may lack devices such as a display 118 and/or keyboard 110 that are not necessarily required to operate it.

The computer 100 executes one or more operating systems such as a variant of MICROSOFT WINDOWS or LINUX. In one embodiment, the computer runs a 64-bit version of WINDOWS VISTA. In general, the operating system executes one or more application programs.

The operating system and application programs executed by the computer are formed of one or more processes. This description utilizes the term "module" to refer to computer program logic for providing a specified functionality. A module can be implemented in hardware, firmware, and/or software. A module is typically stored on the storage device 108, loaded into the memory 106, and executed by the processor 102. A module can include one or more processes, and/or be provided by only part of a process.

Figure 2:
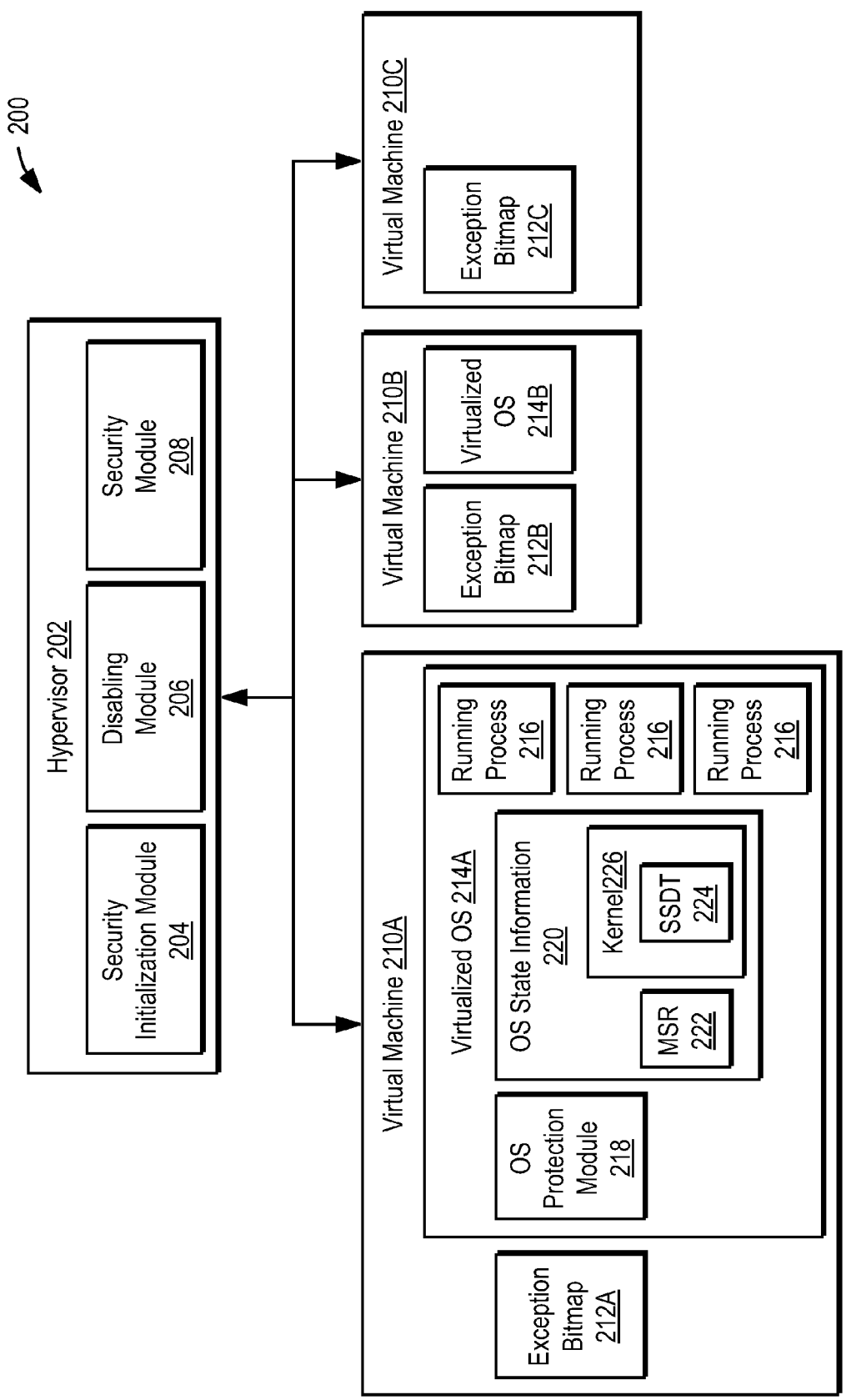
FIG. 2 illustrates a logical view of a computing environment provided by the processor and software according to one embodiment

FIG. 2 illustrates a logical view of a computing environment 200 provided by the processor 102 and software according to one embodiment. The environment 200 includes a hypervisor 202 that supervises the operation of one or more virtual machines 210. Other embodiments can have different and/or additional entities. In addition, the functionalities can be distributed among the entities in a different manner than is described above.

The hypervisor 202 is a hardware-assisted virtual machine emulator. The hypervisor 202 runs at a higher privilege level than the virtual machines 210 and is generally capable of creating virtual machines, interrupting the execution of virtual machines, and switching execution from one virtual machine to another or to the hypervisor itself. As mentioned above, the hypervisor 202 is supported by virtualization technology in the processor 102. In one embodiment, the hypervisor 202 may run software modules such as a security initialization module 204 and a security module 208 that affect the operation of the virtual machines 210, in this case to provide additional security.

A virtual machine 210 is a self-contained environment for running software under a hypervisor 202. As a hardware-assisted emulated environment, the virtual machine 210 provides software running on it with a complete address space and a complete set of processor registers. The software contains machine instructions executed by the processor 102. When the hypervisor 202 suspends execution in a virtual machine 210, it preserves the state of the virtual machine, including its memory and registers. Software running in a virtual machine 210A generally cannot access data within or even detect the presence of another virtual machine 210B or the hypervisor 202. Although three virtual machines 210 are shown as an example in FIG. 2, there may generally be one or more virtual machines in a computing environment 200.

Each virtual machine 210 is associated with an exception bitmap 212 that allows the hypervisor 202 to gain control and suspend the virtual machine at desired points. Software running on the virtual machine 210, and software generally, may occasionally cause an interrupt, for example by executing an INT machine instruction on some processor 102 architectures. There are a number of possible interrupts, such as INT 2E or INT 3, that result in various interrupt handling code being run. The exception bitmap 212 has a bit corresponding to each possible interrupt. When the bit corresponding to an interrupt is set to 1 and software on the virtual machine 210 calls the interrupt, the virtual machine suspends (stops executing) and control passes to the hypervisor 202. Thus, the hypervisor 202 can set appropriate bits on the exception bitmap 212 to cause control to pass to the hypervisor when the software on the virtual machine 210 calls certain interrupts.

In some cases, it is desirable to pass control to the hypervisor 202 at times when the software is not calling any interrupt. In one embodiment, the hypervisor 202 can do so by setting breakpoints on certain machine instructions in the software running on the virtual machine 210 that cause a specific interrupt when those instructions are fetched. For example a breakpoint can be set at an instruction at the start of a certain function, causing an INT 3 to be triggered when that function is called by the software. The processor 102 may support a limited number of these breakpoints. The exception bitmap 212 can then be set to catch the interrupts created by these breakpoints and allow control to be transferred to the hypervisor 202 upon execution of the machine instruction of interest.

One type of software that can be run on a virtual machine 210 is a virtualized operating system 214. For clarity, the following description considers the case of a single virtualized operating system 214A, but the same description can be applied to the case of multiple virtualized operating systems 214. The virtualized operating 214 system may be an operating system such as WINDOWS VISTA 64-bit edition capable of being run directly on processor 102. In one embodiment, the virtualized operating system 214 runs processes 216 at a lower privilege level than itself. In one embodiment, parts of the virtualized operating system 214 run on different virtual machines 210 or on the hypervisor 202.

The virtualized operating system 214A contains state information 220 that describes the running state of the virtualized operating system at a given time. The state information 220 includes the operating system kernel 226, other operating system code and data (such as device drivers and a network protocol stack), and processor registers. When execution of the virtual machine 210A is suspended and control is transferred to the hypervisor 202, the hypervisor can read and modify the operating system state information 220. This ability of the hypervisor 202 may be used, for example, to analyze and address security threats that may arise in the virtualized operating system 214.

The kernel 226 is the core code and data of the operating system used to run operating system services and manage processes. System calls made by the running processes 216 are implemented in the kernel 226.

A running process 216 may occasionally make a system call to access a system resource. For example, the write( ) system call may allow a running process 216 to write to the storage device 108 using the operating system 214. The system call is run by the operating system kernel 226 at a higher privilege level than the running process 216. In one embodiment, when a running process 216 makes a system call, an interrupt such as INT 2E is triggered. The kernel 226 contains the interrupt handling code which then executes the system call. In another embodiment, a "fast call" type system call may be supported by the processor 102 to avoid triggering an interrupt. Examples include the SYSCALL (Intel) and SYSENTER (AMD) instructions. When a SYSCALL/SY- SENTER instruction is executed, control passes to the kernel 226 which runs the appropriate system call. When the system call is completed, the kernel 226 returns control to the calling process 216.

In one embodiment, a "fast call" type system call is made through the use of one or more Model Specific Registers (MSR) 222 in the processor 102. Some Intel processor architectures with IVT use Model Specific Registers 174 and 176 for this purpose. When a SYSCALL/SYSENTER instruction is run, execution switches to kernel mode and begins at a location specified by the MSR 222. The WRMSR and RDMSR instructions are used to write to and read from the MSR 222, respectively. The virtualized operating system 214 can use WRMSR to set the contents of the MSR to be the location of the system call handling code in the kernel 226. As a result, the SYSCALL/SYSENTER instruction will run the desired system call handling code. Some processors 102 that support virtualization (such as ones with Intel IVT) return control to the hypervisor 202 whenever the WRMSR or RDMSR instructions are called. This is an alternative to using interrupts and the exception bitmap 212 for returning control to the hypervisor 202.

In one embodiment, the system service dispatch table (SSDT) 224 is a kernel 226 data structure used for handling system calls. The SSDT 224 is used in the MICROSOFT WINDOWS VISTA 64-bit operating system, for example. The SSDT 224 contains entries that point to code for carrying out various system calls. In one embodiment, when control is passed to the kernel 226 to run a system call as a result of an interrupt or the "fast call" mechanism described above, the kernel calls an indexing function such as KiFastCallEntry( ) with a parameter corresponding to the type of system call. This indexing function determines the entry in the SSDT 224 corresponding to the system call, and the code referenced by that entry is executed to carry out the system call. The SSDT 224 is created by the operating system kernel 226 soon after startup and is generally not further modified by the operating system 214.

The operating system protection module 218 preserves operating system integrity by detecting changes to the kernel 226 made by malicious software that might disrupt operation of the operating system 214 and pose security threats. The operating system protection module 218 periodically scans the kernel code and data structures, including the SSDT 224, to make sure they have not been modified. An example of such an operating system protection module 218 is PATCH-GUARD on 64-bit versions of MICROSOFT WINDOWS operating systems. The operating system protection module 218 may perform a checksum, a cyclic redundancy check (CRC) or some other verification on the SSDT 224 entries to check if they have been modified. To access the SSDT 224 entries, the operating system protection module 218 must read the MSR 222 using the RDMSR instruction and call the indexing function at the location specified by the contents of the MSR. If the operating system protection module 218 detects that the SSDT 224 has been modified, it may take some remedial action such as halting the system and displaying an error message. By preventing all changes to the kernel 226, the operating system protection module 218 can also disable legitimate security software that modifies the kernel 226 to carry out various security checks.

The security initialization module 204 and security module 208 provide security to the computer 100 by intercepting operating system calls and analyzing the calls in the context of the calling process 216 and operating system state 220 for evidence of malicious intent. In one embodiment, the security initialization module 204 and security module 208 are run from the hypervisor 202. The security initialization module 204 sets up the virtual machine 210A to transfer control to the hypervisor 202 when certain system calls are made in the virtualized operating system 214. The security module 208 then addresses any possible security threat from the system call. As a result, system calls can be intercepted without kernel patching and detection by the operating system protection module 218.

The security initialization module 204 sets up the virtual machine 210A to transfer control to the hypervisor 202 and security module 208 when certain system calls are made in the virtualized operating system 214. If the operating system 214 normally triggers an interrupt when a system call is made, then the security initialization module 204 can set the bit in the exception bitmap 212 corresponding to that interrupt. If system calls are made through the "fast call" SYSCALL/SYSENTER mechanism, the security initialization module 204 can set breakpoints in the kernel code. In one embodiment, a breakpoint can be set at the location of the indexing function, KiFastCallEntry( ) which results in the breakpoint being triggered prior to every system call. In another embodiment, breakpoints can instead be set at the start of the individual kernel routines pointed to by the entries of the SSDT 224. This way, only system calls of interest trigger breakpoints, resulting in better performance of the virtualized operating system 214. The security initialization module 204 also sets the bits in the exception bitmap 212 corresponding to the interrupts produced by the breakpoints.

The security module 208 provides security to the computer 100 by assessing and addressing security threats posed by processes making system calls. In one embodiment, the security module 208 is run by the hypervisor 202 when control is transferred to the hypervisor at the start of a system call to the virtualized operating system 214. In one embodiment, this transfer of control results from initialization of breakpoints and the exception bitmap 212 performed by the security initialization module 204. The security module 208 analyzes the system call of interest by examining the operating system state information 220 and determines if it poses a security threat. If it does, the security module addresses the security threat. When finished, the security module returns control to the virtual machine 210 allowing the virtualized operating system to continue execution.

Although the above description assumes that the security initialization module 204 and the security module 208 are code modules run from the hypervisor 202, other embodiments are possible. First, the modules may be run from within the virtualized operating system 214 of interest. Techniques can be used for communication between the hypervisor 202 and the operating system 214. For example, the hypervisor 202 can inject events such as interrupts into the operating system 214 which can be used to transfer control to the security module 208 within the operating system. The hypervisor 202 can also manipulate the operating system state information 220 as necessary to cause the security module 208 to run when control is transferred back to the operating system 214. Additionally, the security module 208 in the virtualized operating system 214 can use a VMCALL or similar instruction to get information from the hypervisor 202 when control is transferred to it.

The modules may also be located in another virtual machine which may 210B or may not 210C contain an operating system 214. In this case, the hypervisor 202 would run the modules on that virtual machine 210 and provide that virtual machine with the necessary operating system state information 220 from the virtualized operating system 214 of interest to allow the modules to perform their functions. The modules, as above, can use the VMCALL or similar instruction to request further information from the hypervisor 202. The modules may have different locations from each other and may be combined or further broken up into smaller modules as necessary.

In one embodiment, the disabling module 206 can disable or circumvent the operating system protection module 218. The disabling module 206 allows security to be provided using standard kernel patching techniques, including modifying the SSDT 224, within the virtualized operating system 214 to intercept system calls. In one embodiment, the disabling module is run from the hypervisor 202.

As described above, the operating system protection module 218 periodically checks to make sure that the SSDT 224 and its entries have not been modified. In order to do this, it determines the location of the SSDT entries by executing a RDMSR instruction. When executed, the RDMSR instruction suspends control of the virtual machine 210 and passes control to the hypervisor 202. In one embodiment, the hypervisor 202 runs the disabling module 206 which examines the operating system state information 220 to determine that the operating system protection module 218 called an RDMSR instruction in order to access the SSDT 224. The disabling module 206 may use certain heuristics to make this determination, such as noting the calling instruction pointer and the frequency of calls (since the operating system module runs with a certain frequency).

In one embodiment, the disabling module 206 can disable the operating system protection module 218 by modifying the registers and/or stack in the operating system state 220 causing the operating system protection module 218 to simply exit without performing the check upon resumption of the virtualized operating system 214. In another embodiment, the disabling module 206 can modify the process table in the operating system state 220 to cause the operating system protection module process to sleep forever. One skilled in the art will recognize that there are many specific possibilities for disabling or circumventing the operating system protection module 218 using the basic architecture described here.

Figure 3:
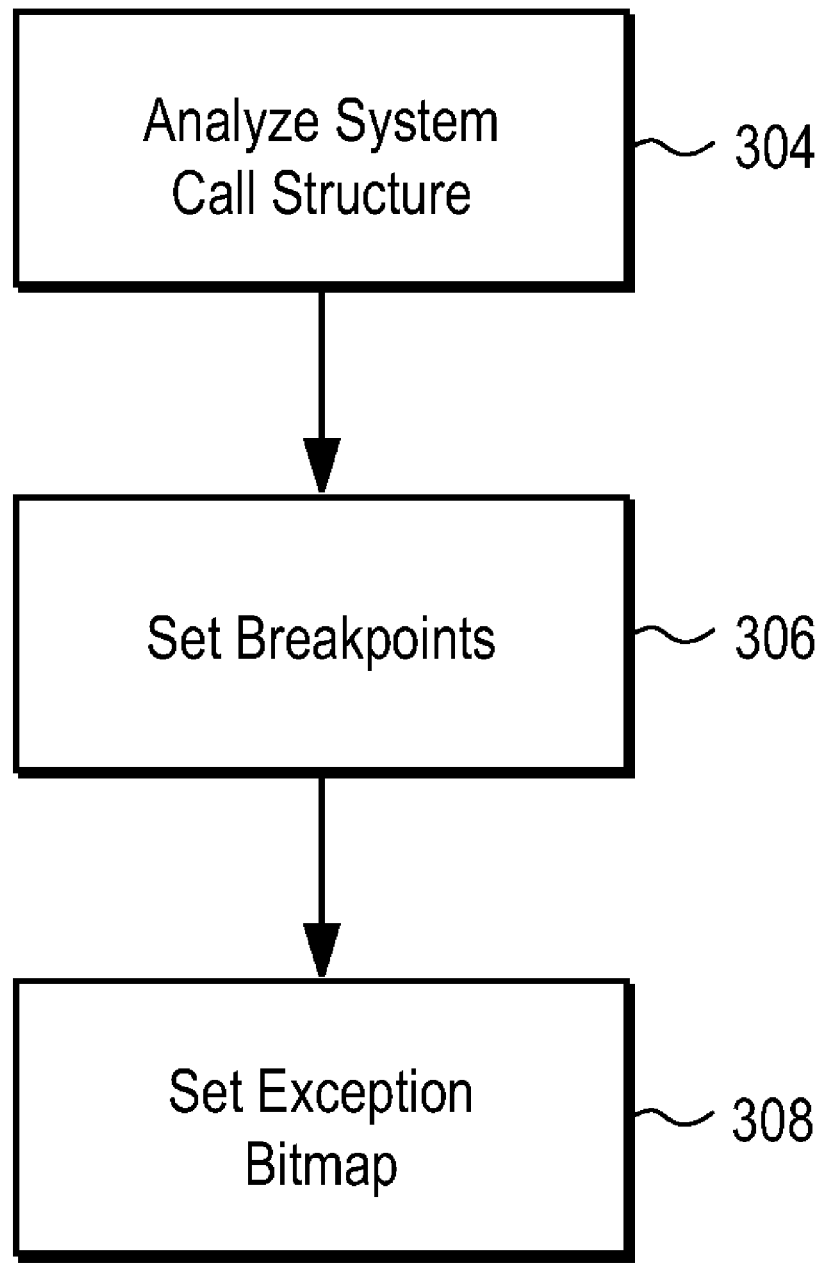
FIG. 3 is a flowchart illustrating the operation of the security initialization module according to one embodiment.

FIG. 3 is a flowchart illustrating the operation of the security initialization module 204 according to one embodiment. The security initialization module 204 analyzes 304 the system call structure, including the SSDT 224, in the operating system kernel 226. Operation 304 can be performed at any time after the initial setup of the system call structure has been completed by the virtualized operating system 214. In one embodiment, the completion of the initial setup can be determined when the virtualized operating system 214 calls the WRMSR instruction to set the MSR 222 to the location of the SSDT 224 indexing function. As described above, the WRMSR instruction results in a transfer of control from the virtual machine 210 to the hypervisor 202. After analyzing 304 the system call structure, the security initialization module 204 sets 306 breakpoints, if necessary, at points in the kernel code. The security initialization module 204 sets 308 the exception bitmap 212 to cause control to transfer to the hypervisor 202 when the appropriate interrupts are caused by either the virtualized operating system 214 or the breakpoints.

Figure 4:
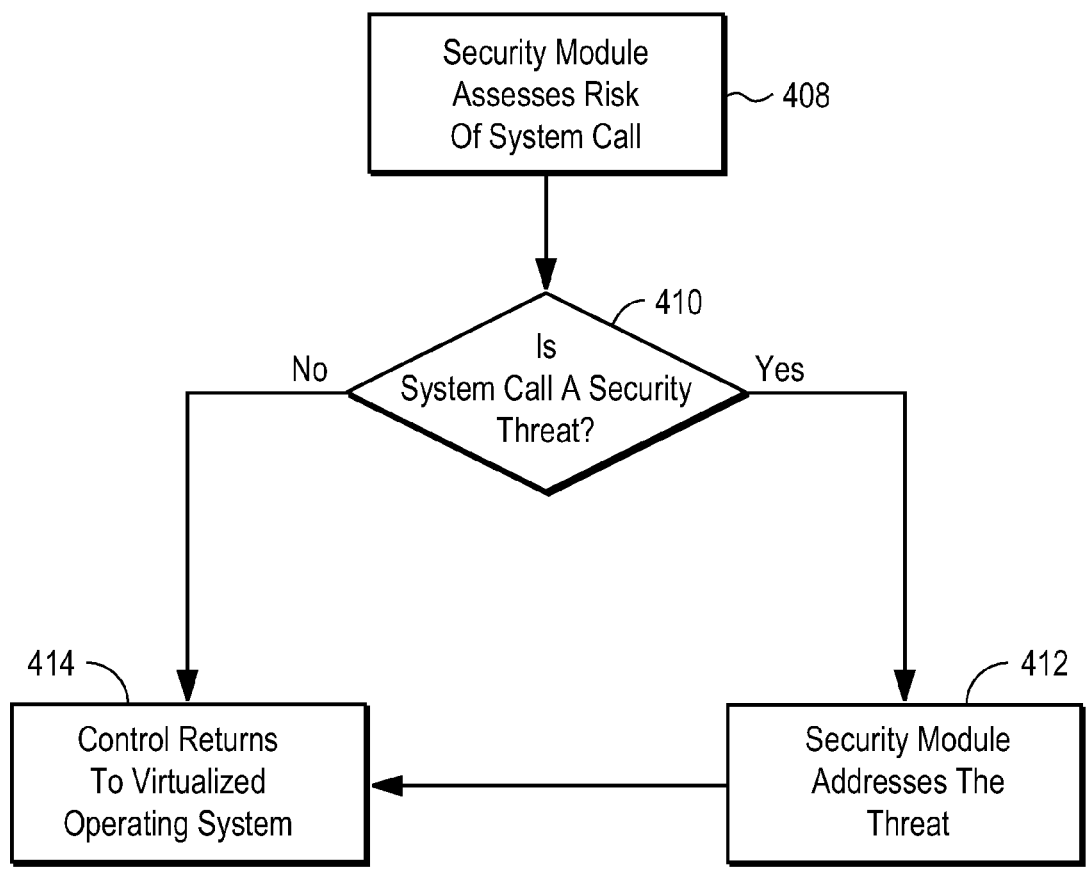
FIG. 4 is a flowchart illustrating the operation of the security module according to one embodiment.

FIG. 4 is a flowchart illustrating the operation of the security module 208 according to one embodiment. As described above, an embodiment of the security module 208 is called upon the interrupt of a system call made in the virtualized operating system 214. This is accomplished by initialization performed by the security initialization module 204. The security module 208 assesses 408 the security risk of the system call in the context of the calling process 216 in the virtualized operating system 214. To perform the assessment, the security module examines the operating system state information 220 in the suspended virtualized operating system 214. By examining this state information 220, the security module 208 can determine the process making the system call, the type of system call, the parameters to the system call, and any other information about the current state of the operating system 214. The security module 208 may determine a security risk based on a wide variety of heuristics. For example, the security module 208 may consider a system call with an invalid parameter a security risk because of the possibility of a buffer overflow attack, or it may consider a process making excessive numbers of resource-consuming system calls in a short period of time a security risk. As another example, the security module 208 may examine whether the calling process has appropriate permission to open a certain file or modify certain system settings using various system calls.

If the security module 208 determines 410 that the system call is not a security threat, then the security module returns control to the virtualized operating system 214, allowing it to resume execution. If the security module determines 410 that the system call poses a security threat to the computer 100, the module addresses the security threat. There are many options for addressing the security threat. For example, the security module 208 may kill the process and notify the user that the process was found to be a security threat. The security module 208 may instead modify the system call so that it is no longer dangerous and allow the process to continue execution, possibly also notifying the user or logging the action taken. The security module may also simply act as a monitor, logging the various system calls made by certain processes without taking other actions. Once the security threat has been addressed, the security module returns control to the virtualized operating system 214 and allows it to continue execution (unless the security module decides the threat is so severe that it must halt the entire operating system 214).

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. A system for providing security in a computer having a virtual machine controlled by a hypervisor, the virtual machine having an operating system with an operating system kernel and an operating system protection module that detects modifications to the operating system kernel, the system comprising:
   a computer processor; and
   a non-transitory computer-readable storage medium storing computer program modules configured to execute on the computer processor, the computer program modules comprising:
   a security initialization module for modifying the operating system kernel of the virtual machine to pass execution from the virtual machine to the hypervisor responsive to a system call issued by a process executing within the virtual machine, wherein modifying the operating system kernel comprises:
      setting a breakpoint in the operating system kernel to cause an interrupt upon the system call being issued by the process and
      setting an exception bitmap in the virtual machine to pass execution from the virtual machine to the hypervisor responsive to the interrupt;

a disabling module for setting a state in the virtual machine to pass control to the hypervisor during execution of the operating system protection module and for altering functioning of the operating system protection module to prevent the operating system protection module from detecting the modification of the operating system kernel; and a security module activated responsive to execution being passed to the hypervisor due to the modification by the security initialization module and for analyzing the process to determine whether the process poses a security threat.

2. The system of claim 1, wherein the virtual machine includes a system service dispatch table (SSDT) that contains a reference to the system call and a processor register that provides the location of the SSDT, and wherein the security initialization module uses the processor register to locate the reference to the system call in the SSDT.

3. The system of claim 1, wherein the security module is executed within the hypervisor.

4. The system of claim 1, wherein the security module takes remedial action in response to detecting a security threat.

5. A computer program product having a non-transitory computer-readable medium having computer program instructions recorded thereon for providing security in a computer having a virtual machine controlled by a hypervisor, the virtual machine having an operating system with an operating system kernel and an operating system protection module that detects modifications to the operating system kernel, the computer program product comprising:

a security initialization module for modifying the operating system kernel of the virtual machine to pass execution from the virtual machine to the hypervisor responsive to a system call issued by a process executing within the virtual machine, wherein modifying the operating system kernel comprises:

setting a breakpoint in the operating system kernel to cause an interrupt upon the system call being issued by the process; and setting an exception bitmap in the virtual machine to pass execution from the virtual machine to the hypervisor responsive to the interrupt;

a disabling module for setting a state in the virtual machine to pass control to the hypervisor during execution of the operating system protection module and for altering functioning of the operating system protection module to prevent the operating system protection module from detecting the modification of the operating system kernel; and a security module activated responsive to execution being passed to the hypervisor due to the modification by the security initialization module and for analyzing the process to determine whether the process poses a security threat.

6. The computer program product of claim 5, wherein the virtual machine includes a system service dispatch table (SSDT) that contains a reference to the system call and a processor register that provides the location of the SSDT, and wherein the security initialization module uses the processor register to locate the reference to the system call in the SSDT.

7. The computer program product of claim 5, wherein the security module is executed within the hypervisor.

8. The computer program product of claim 5, wherein the security module takes remedial action in response to detecting a security threat.

9. A computer-implemented method of providing security in a computer having a virtual machine controlled by a hypervisor, the virtual machine having an operating system with an operating system kernel and an operating system protection module that detects modifications to the operating system kernel, the method comprising:

modifying an operating system kernel of the virtual machine to pass execution from the virtual machine to the hypervisor responsive to a system call issued by a process executing within the virtual machine, wherein modifying the operating system kernel comprises:

setting a breakpoint in the operating system kernel to cause an interrupt upon the system call being issued by the process; and setting an exception bitmap in the virtual machine to pass execution from the virtual machine to the hypervisor responsive to the interrupt;

setting a state in the virtual machine to pass control to the hypervisor during execution of the operating system protection module;

responsive to control being passed to the hypervisor due to the state set, altering function of the operating system protection module to prevent the operating system protection module from detecting the modification of the operating system kernel; and responsive to execution being passed to the hypervisor due to the modification of the operating system kernel, analyzing the process to determine whether the process is a security threat.

10. The computer implemented method of claim 9, wherein the virtual machine includes a system service dispatch table (SSDT) that contains a reference to the system call and a processor register that provides the location of the SSDT, further comprising:

using the processor register to locate the reference to the system call in the SSDT.

11. The computer implemented method of claim 9, wherein analyzing the process to determine whether it is a security threat is executed within the hypervisor.

12. The computer implemented method of claim 9, further comprising:

responsive to the process being determined to be a security threat, taking remedial action.

* * * * *